United States Patent [19]

Breaux

[11] 4,127,804

[45] Nov. 28, 1978

[54] ELECTROSTATIC ENERGY CONVERSION SYSTEM

[75] Inventor: Onezime P. Breaux, Trotwood, Ohio

[73] Assignee: The United States of America as represented by the Secretary of the Air Force, Washington, D.C.

[21] Appl. No.: 689,272

[22] Filed: May 24, 1976

[51] Int. Cl.² ............................................. H02N 1/00
[52] U.S. Cl. .................................... 322/2 A; 310/308; 320/1
[58] Field of Search ...................... 322/2 A; 310/5, 10, 310/308, 309; 320/1

[56] References Cited

U.S. PATENT DOCUMENTS

| | | | |
|---|---|---|---|
| 2,540,327 | 2/1951 | Felici | 322/2 A X |
| 3,094,653 | 6/1963 | LeMay et al. | 322/2 A |
| 3,971,938 | 7/1976 | O'Hare | 310/5 X |
| 4,054,826 | 10/1977 | Wahlstrom | 322/2 A |

*Primary Examiner*—Robert J. Hickey
*Attorney, Agent, or Firm*—Joseph E. Rusz; Robert Kern Duncan

[57] ABSTRACT

Two inversely ganged variable capacitors having a common movable element varying the capacities such that when one capacitor is at maximum capacitance, the other is at minimum capacitance, have, after initially charging, a substantially constant contained or trapped charge distributed between the two capacitors. As the capacities of the capacitors are varied, a potential difference is developed between the fixed plate of one capacitor and the fixed plate of the other. When these two potential points are connected to a load, charge is transferred from one capacitor to the other as a current flow through the load. The total charge is not diminished, the energy supplied the load being the energy expanded on moving the movable charged plates. As the movable plates are moved in a cyclic manner an alternating current is provided to the load.

8 Claims, 19 Drawing Figures

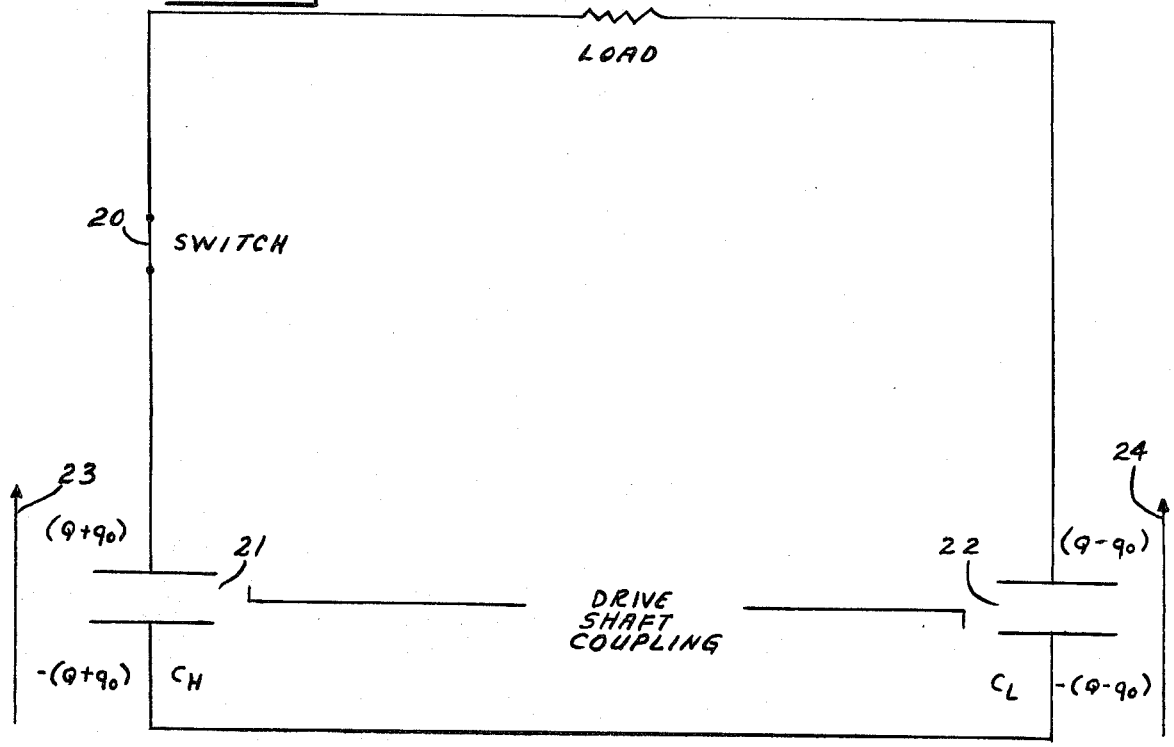
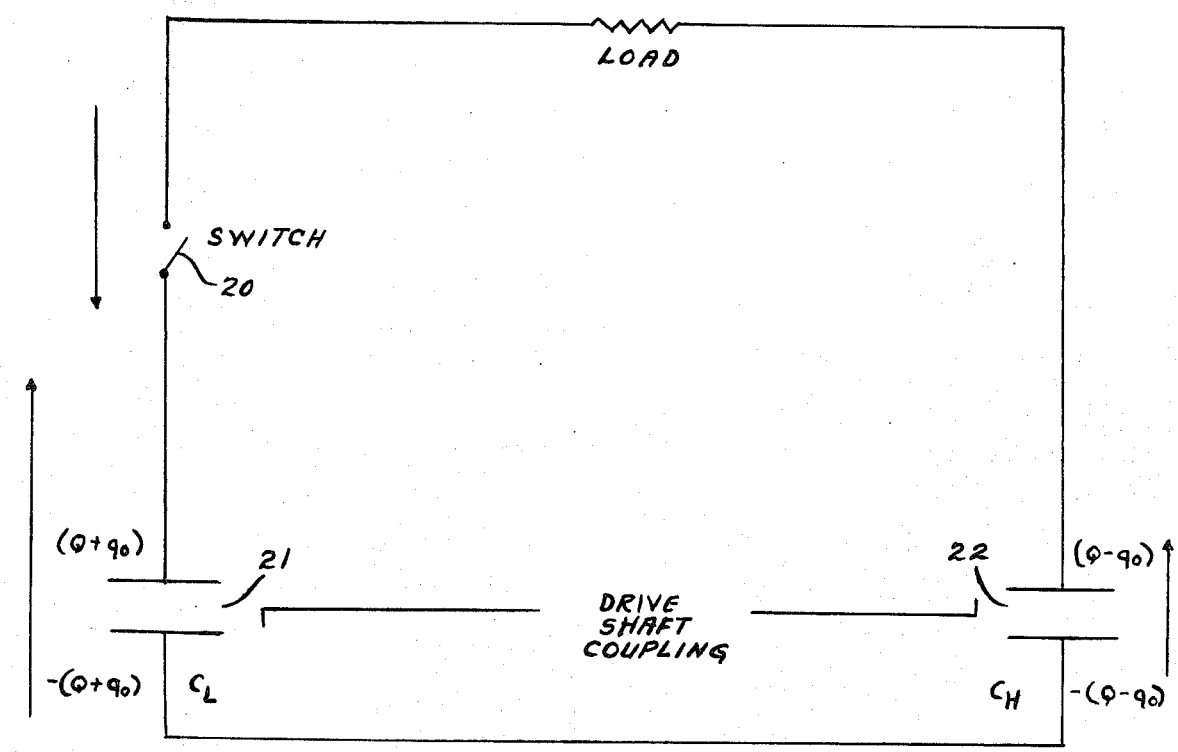

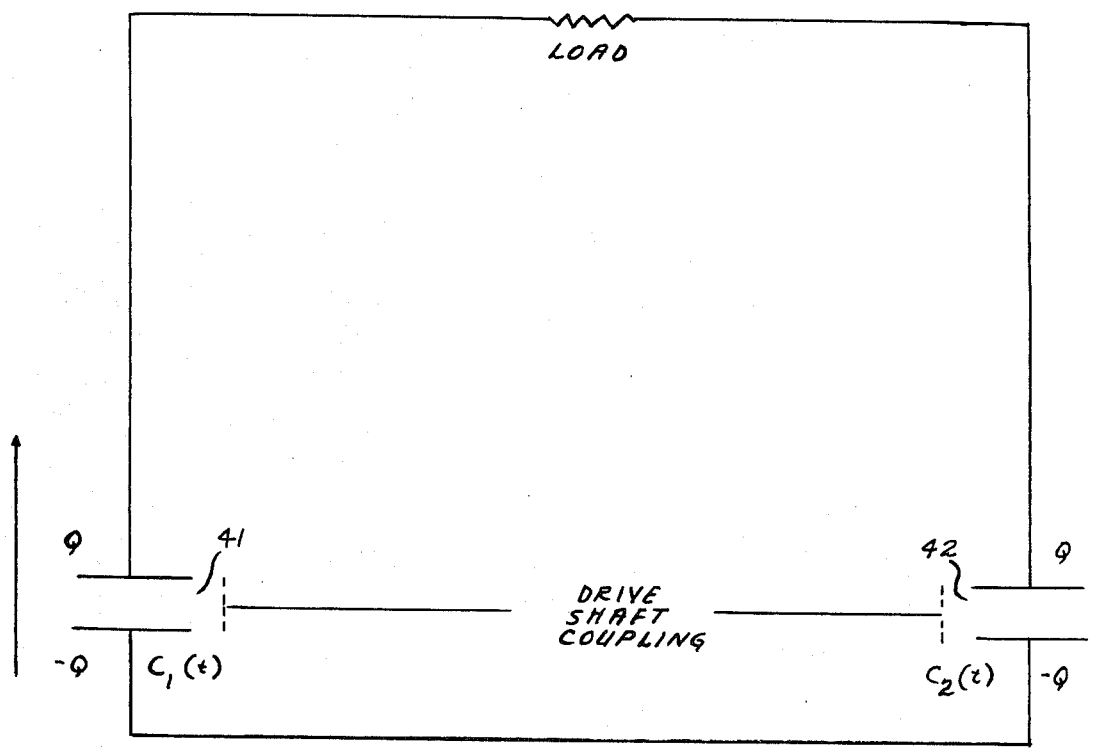
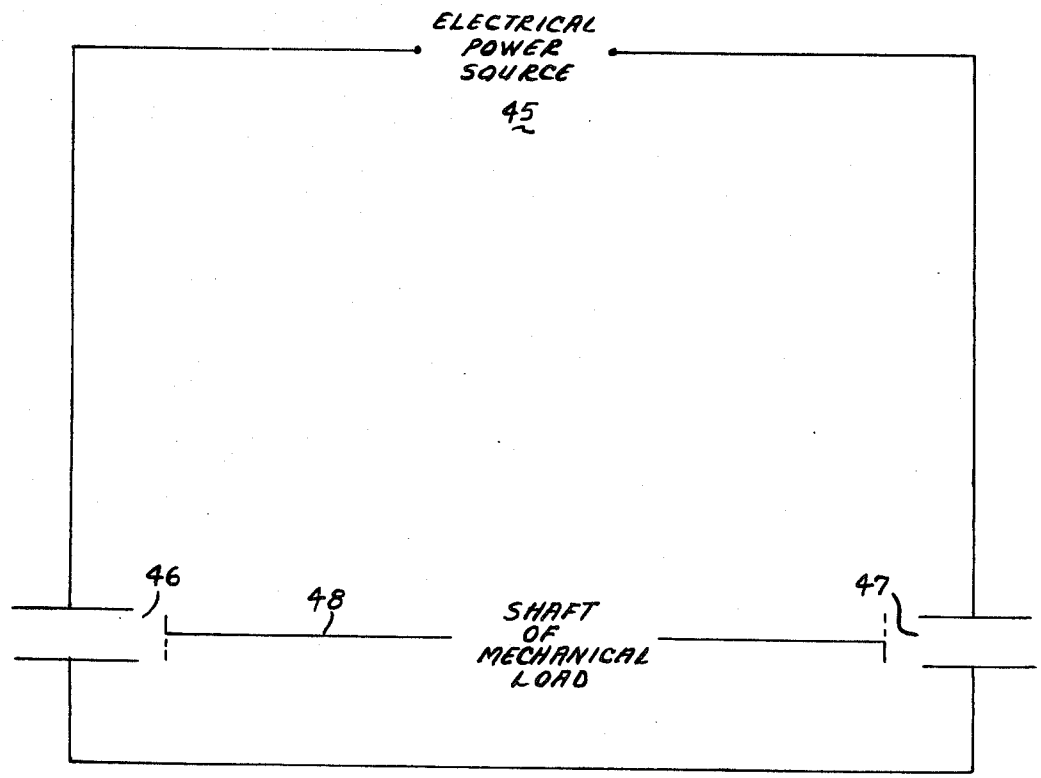

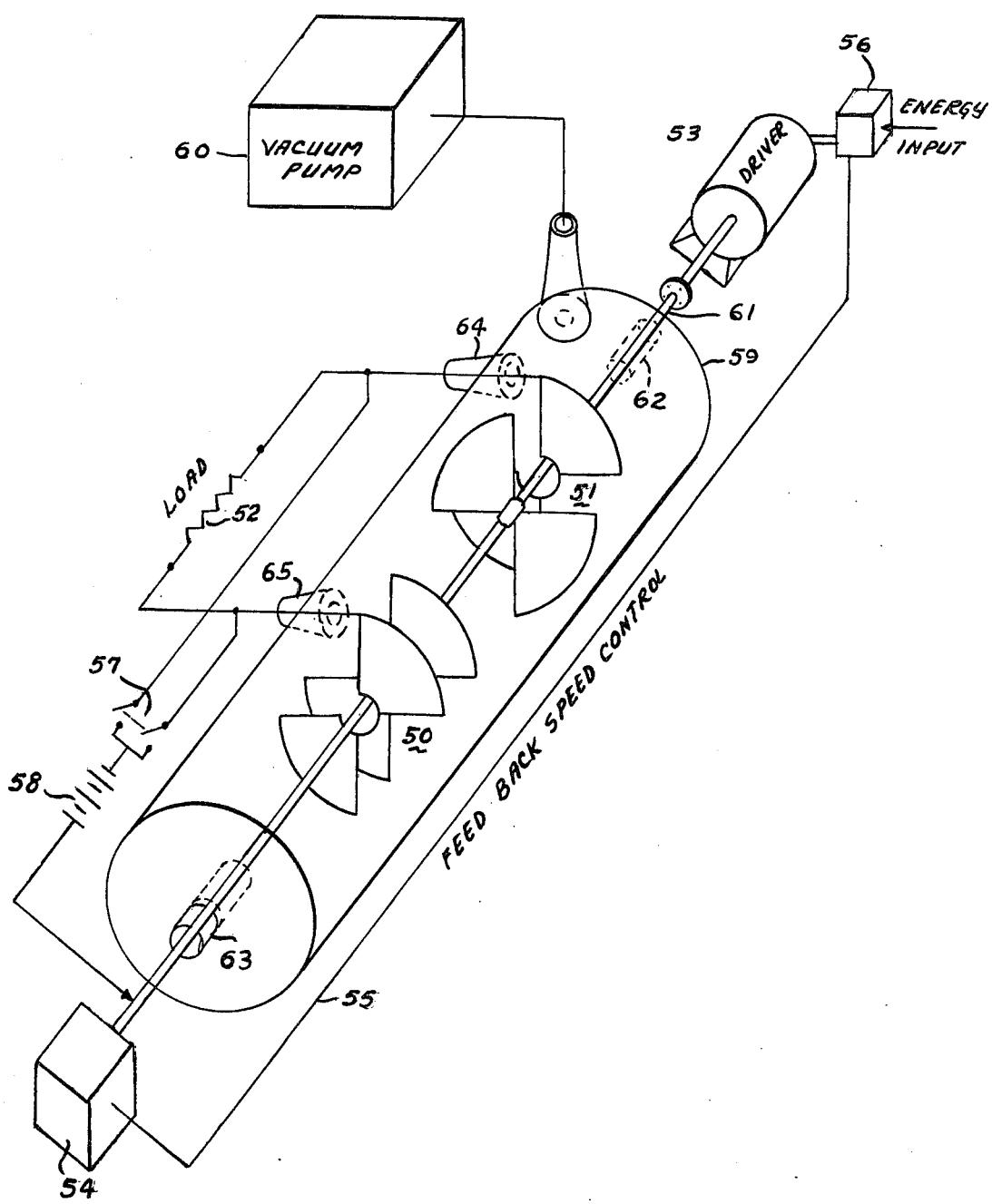

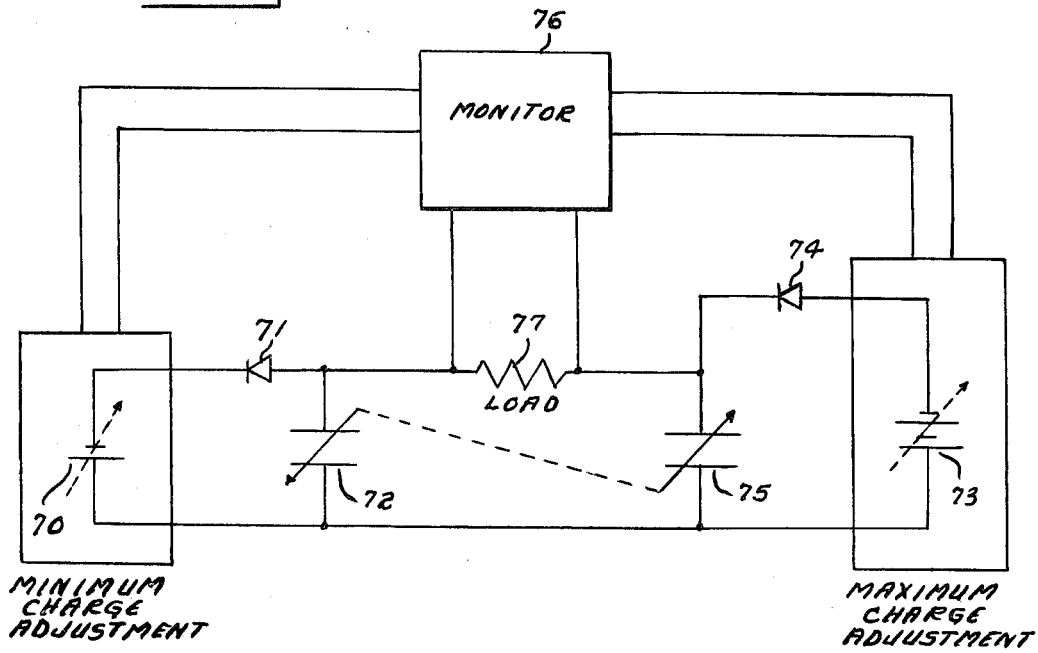
Fig-18
MINIMUM CHARGE ADJUSTMENT
MAXIMUM CHARGE ADJUSTMENT
Fig-19
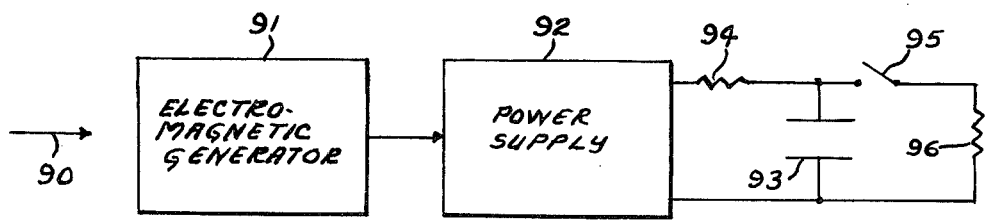
PRIOR ART
SHAFT POWER
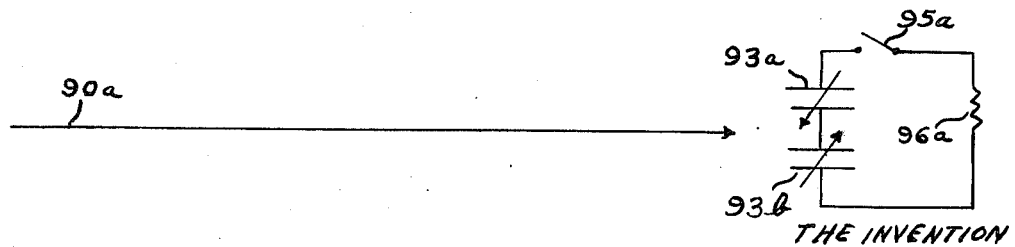
THE INVENTION

ELECTROSTATIC ENERGY CONVERSION SYSTEM

RIGHTS OF THE GOVERNMENT

The invention described herein may be manufactured and used by or for the Government of the United States for all governmental purposes without the payment of any royalty.

BACKGROUND OF THE INVENTION

The field of the invention is in electrostatic machines.

Electrostatic machines have been well known for many years. The Toepler-Holtz and the Wimshurst machines were early electrostatic generators. Now their usage is mainly for demonstrations in the Physics Laboratory. The only remaining electrostatic machine to remain in extensive usage is the Van de Graaff type electrostatic generator. It is presently used to generate extremely high voltage potentials for atomic research. Substantially all of the prior art devices are direct current type machines.

The following publications may be helpful in further understanding the art. Electrostatic Sources of Electric Power, John G. Trump, Electrical Engineering, Vol. 66, No. 6, June 1947, pages 525–534; U.S. Pat. No. 2,810,878 to patentee N. Felici, and U.S. Pat. No. 3,094,653 to patentees D. B. LeMay et al.

SUMMARY OF THE INVENTION

An ac electrostatic variable capacity energy conversion system utilizing a fixed contained charge functions as an electrical generator when mechanically driven or as a motor providing mechanical shaft power when electrically driven.

BRIEF DESCRIPTION OF THE DRAWING

FIG. 7 is a schematic diagram of a pulsed energy input embodiment of the invention in State A;

FIG. 8 is the same embodiment except in State B;

FIG. 15 is a schematic diagram of an embodiment of the invention having continuous mechanical input providing a continuous wave (cw) electrical output with the generators directly connected to the load;

FIG. 16 is a schematic diagram of an energy conversion system of the invention wherein the system functions as a motor receiving electrical energy and delivering mechanical energy;

FIG. 17 is a pictorial-block-schematic diagram of an embodiment of the invention for receiving rotational energy from a mechanical source and delivering electrical energy to a load;

FIG. 18 is a schematic drawing shown a control system for maintaining a given maximum and minimum charge on the generating capacitors; and FIG. 19 is a block-schematic diagram showing the improvement of the disclosed invention over a typical prior art system.

DESCRIPTION OF THE PREFERRED EMBODIMENTS

In embodiments of the invention, energy conversion is obtained for the Variable Capacitance Electrostatic Energy Conversion System by operation of variable capacitance electrostatic generators, involving contained charge, in paired opposition to one another across the load (or electrical source of power), either directly or indirectly through dielectric material, to provide for conversion of mechanical energy to electrical energy (or electrical energy to mechanical energy).

For a variable capacitance electrostatic generator, the electrical power input to the capacitor, $P_e$(watts), is equal to the increase in capacitor electrostatic field energy, $W_{ef}$(joules), per unit time, $t$ (seconds), and the mechanical power output, $P_M$ (watts):

$$P_e = (dW_{ef}/dt) + P_M$$

with
$P_e = Vdq/dt$
$V$ = capacitor potential (volts)
$q$ = charge on capacitor (coulombs)
and $W_{ef} = \frac{1}{2} CV^2$
$C$ = capacitor capacitance (farads)
Also, $q = CV$
Therefore, $P_M = \frac{1}{2} V^2 (dC/dt)$
and the time rate of conversion of mechanical to electrical energy, $dW_{ME}/dt$, equal to $-P_M$, is given as $$dW_{ME}/dt = -\frac{1}{2} V^2 (dC/dt)$$

Conversion of mechanical shaftpower to electrical power to a load by variable capacitance electrostatic generators operating in paired opposition to one another across the load (and involving contained charge) shall be considered first.

Figure 1:
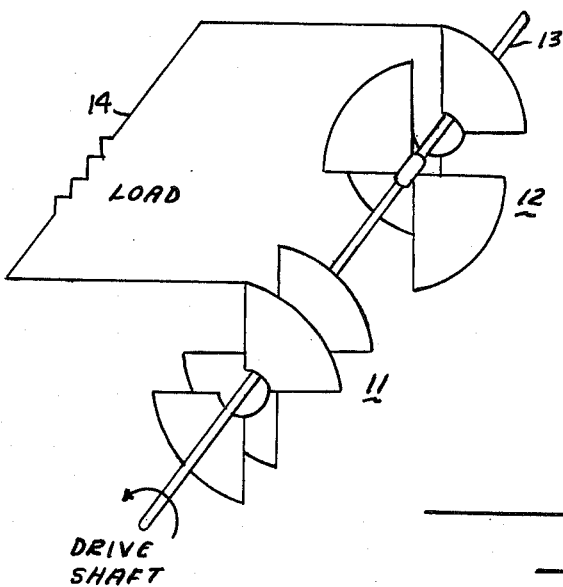
FIG. 1 is a simplified pictorial-schematic diagram representative of a rotational generator embodiment of the invention.
Figure 2:
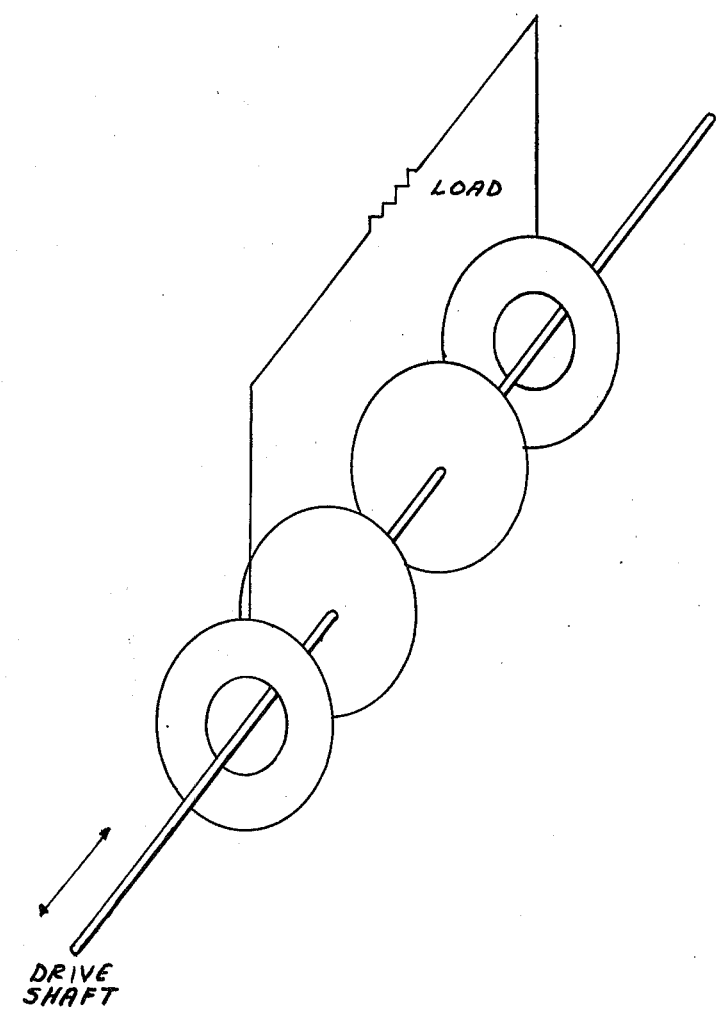
FIG. 2 is a simplified pictorial schematic diagram representative of a reciprocally driven generator embodiment of the invention.
Figure 3:
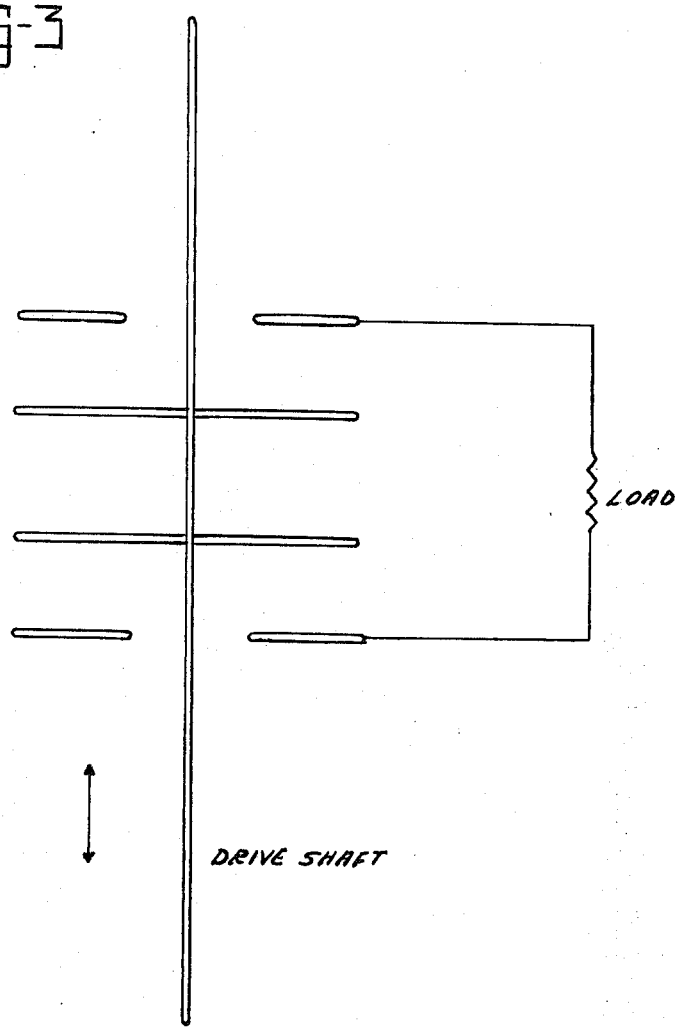
FIG. 3 is an electrical schematic diagram of the embodiment illustrated in FIG. 2.
Figure 4:
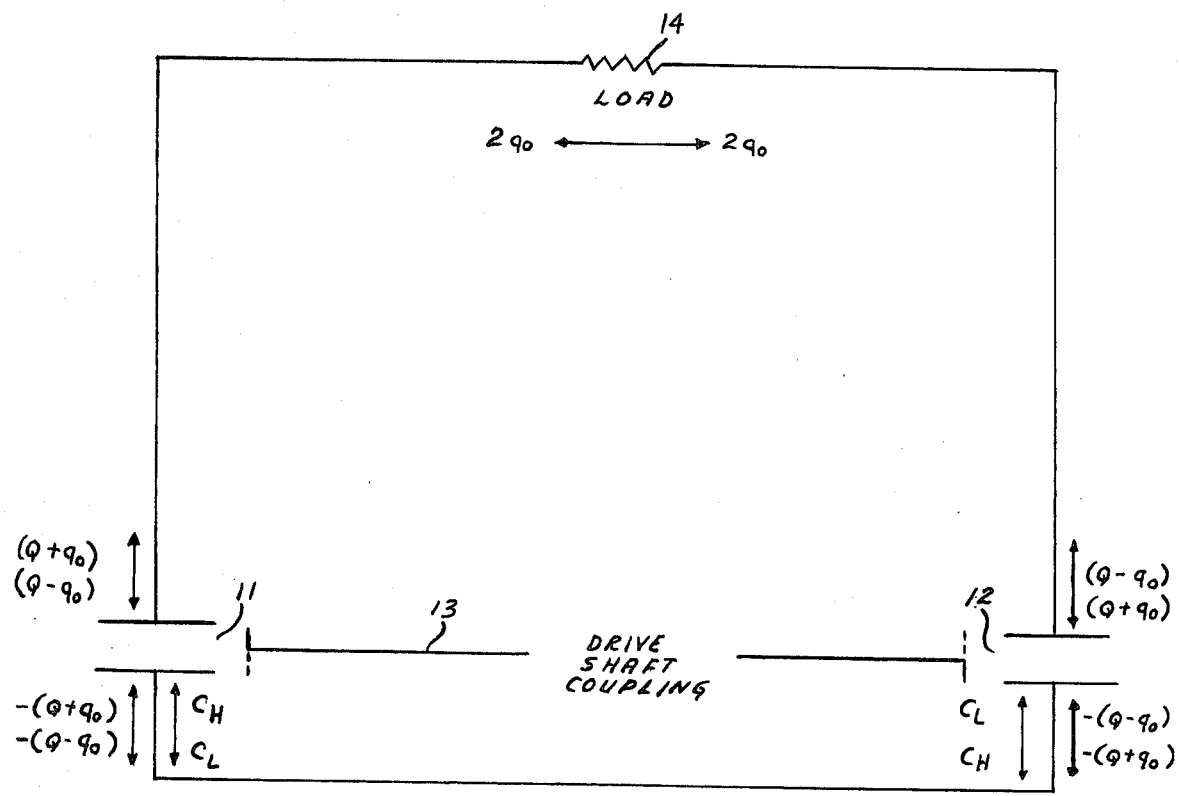
FIG. 4 is a schematic diagram illustrative of the electrical charges and capacitances of the embodiment physically illustrated in FIG. 1.

Examples of two specific physical arrangements of electrostatic generators operating in paired opposition to one another connected directly to a load R (ohms) are shown in FIGS. 1 and 2. Capacitance change is by rotary motion in the embodiment of FIG. 1 and reciprocating motion for the embodiment represented by FIG. 2. FIG. 2 is shown in partial schematic form in FIG. 3 and the electrical schematic diagram for the device of FIG. 1 is shown in FIG. 4. Referring to FIGS. 1 and 4, the capacitors 11 and 12 each range in value from high capacitance $C_H$ to low capacitance $C_L$ and are coupled by the drive shaft 13 so that they operate in opposition to each other; that is, when one capacitor has value $C_H$, the other capacitor has value $C_L$, and vice versa. The capacitors each are initially charged to possess a charge Q, and hence there exists a contained (or "trapped") charge of 2Q for the system. As variable capacitor 11 varies from $C_H$ to $C_L$, its charge varies from $(Q + q_o)$ to $(Q - q_o)$; as variable capacitor 12 varies from $C_L$ to $C_H$, its charge varies from $(Q - q_o)$ to $(Q + q_o)$. A charge $2q_o$ is directly transferred across the load 14. As capacitor 11 is decreasing in capacitance mechanical energy is converted by it to electrical energy and electrical energy is converted to mechanical energy by variable capacitor 12 which is increasing in capacitance. However, since capacitor 12 is drive-shaft coupled to capacitor 11, this mechanical energy may be considered as simultaneously reconverted to electrical energy. With rotation, capacitor 11 reaches the state initially occupied by capacitor 12 and capacitor 12 is now in the state initially occupied by capacitor 11. As the drive shaft continues to rotate, the capacitors return to their respective initial states with another transfer of charge $2q_o$ across the load, and a cycle is completed.

Figure 5:
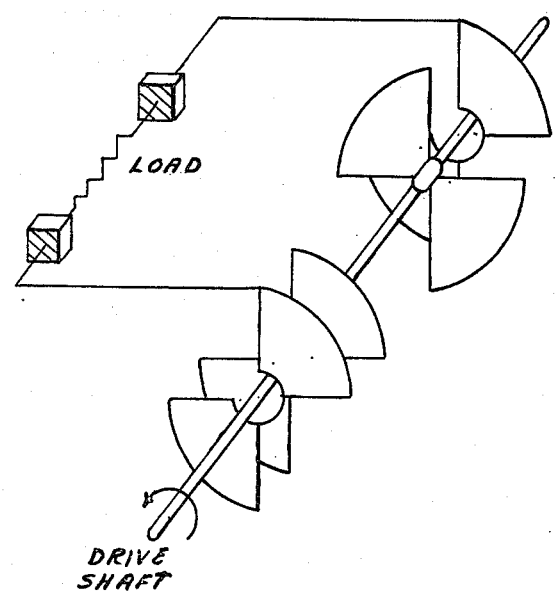
FIG. 5 is a pictorial-schematic representation of an embodiment of the invention wherein the load is between dielectric materials.
Figure 6:
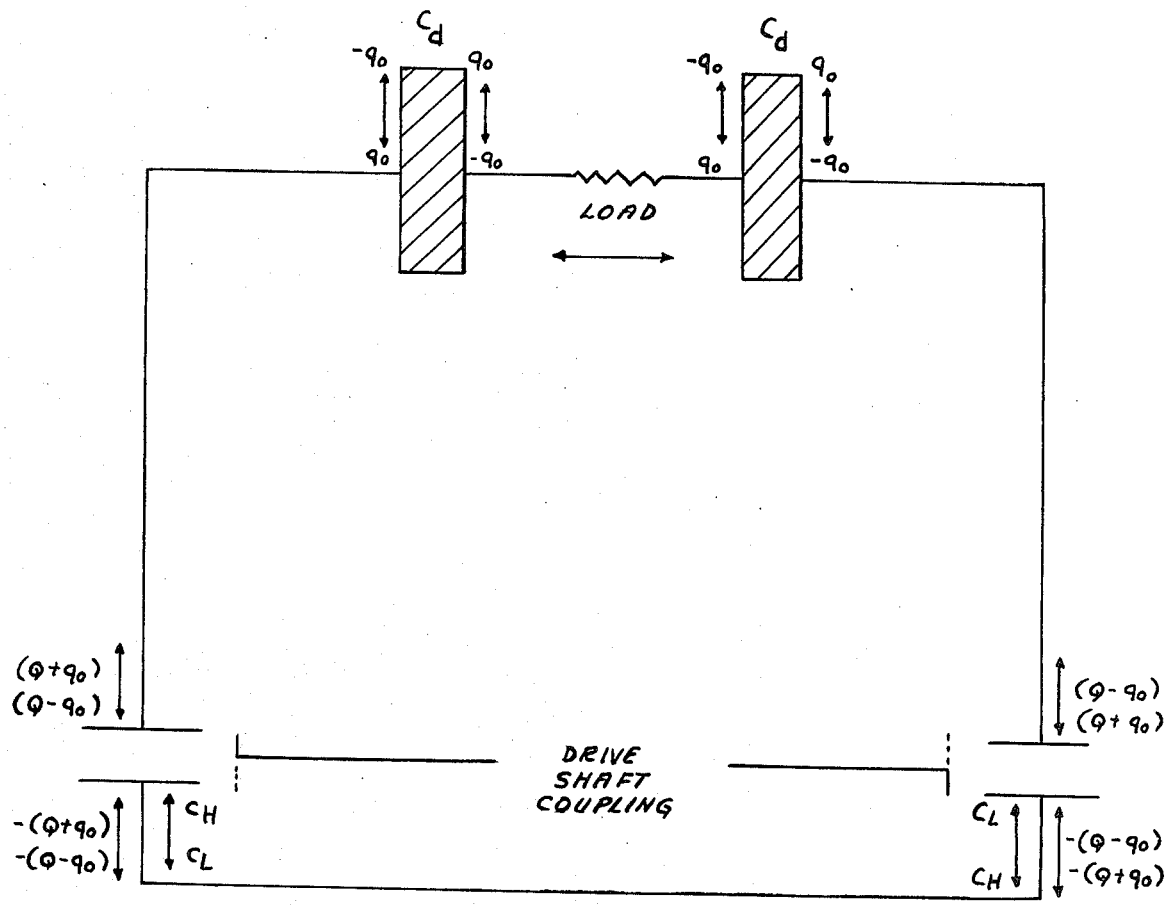
FIG. 6 is a schematic diagram of the system shown in FIG. 5 illustrative of the charges and capacitances.

A schematic-pictorial physical arrangement of the electrostatic generators operating in paired opposition to one another, indirectly connected to the load through dielectric (insulating) material, is shown in FIG. 5; an electrical schematic diagram for this embodiment is shown in FIG. 6. The advantages of using a dielectric as electrode material is well known as exemplified by U.S. Pat. No. 3,745,481 to patentees G. F. Erickson et al. In this embodiment for each cycle a charge of $4q_o$ is transferred by displacement across the load; there is charge $q_o$ associated with the dielectric material capacitors of capacitance $c_d$.

The simplified embodiments presented above were for initial explicit exposition of the concept involved for the Energy Conversion System. The following embodiments, presented in more detail, will explain the operation of the system and aid in the comprehension of the invention.

The pulsed energy input systems with the generators directly connected to the load are perhaps the easiest to comprehend. The electrical schematic diagram of these embodiments is shown in FIG. 7. It is similar to the electrical schematic diagram of previous FIG. 4 except for the added switch 20. The pictorial diagram of FIG. 1 is also a suitable physical representation if a switch is placed in the line going to the load. The operation will be explained considering four states or positions of the capacitors after a movement from their prior state. It is assumed that the capacitors have been initially charged and that operation through previous cycles has taken place. The switch is triggered cyclicly as a function of drive shaft position.

State A (FIG. 7): Capacitor 21 has capacitance $C_H$ and a charge $(Q + q_o)$; capacitor 22 has capacitance $C_L$ and a charge $(Q - q_o)$; the potentials (volts) across the capacitors are equal. (NOTE: The magnitude of the potentials associated with the various circuit elements are indicated by the relative length of the arrows in the schematics as presented in the figures, e.g., arrows 23 and 24, with the tip of the arrow indicating the direction of increasing potential for the charge; the arrows, representing the potential, are not necessarily drawn to scale.) The switch is in closed position; the switch, for the purpose of this exposition, shall be considered as an ideal switch (that is, it has negligible inductance, infinitely small capacitance relative to other circuit elements, infinite resistance when open, and zero resistance when closed). The potential across a capacitor is equal to the charge on the capacitor divided by its capacitance, therefore;

$$(Q + q_o)/C_H = (Q - q_o)/C_L$$

The energy associated with the electrostatic field of a capacitor is given by one-half the value of its charge squared, divided by its capacitance. Therefore, the total electrical energy of the electric circuit in State A, $W_A$, is given as $$W_A = \tfrac{1}{2}(Q + q_o)^2/C_H + \tfrac{1}{2}(Q - q_o)^2/C_L$$

The switch is opened and, as the drive shaft rotates, the capacitances of capacitors 1 and 2 change to State B.

State B (FIG. 8): Capacitor 21 now has capacitance $C_L$ and capacitor 22 has capacitance $C_H$. The total electrical energy for the electric circuit in State B, $W_B$, is given as $$W_B = \tfrac{1}{2}(Q + q_o)^2/C_L + \tfrac{1}{2}(Q - q_o)^2/C_H$$

The potential rise across capacitor 21 is equal to the potential drop across the switch 20 and across capacitor 22.

Figure 9:
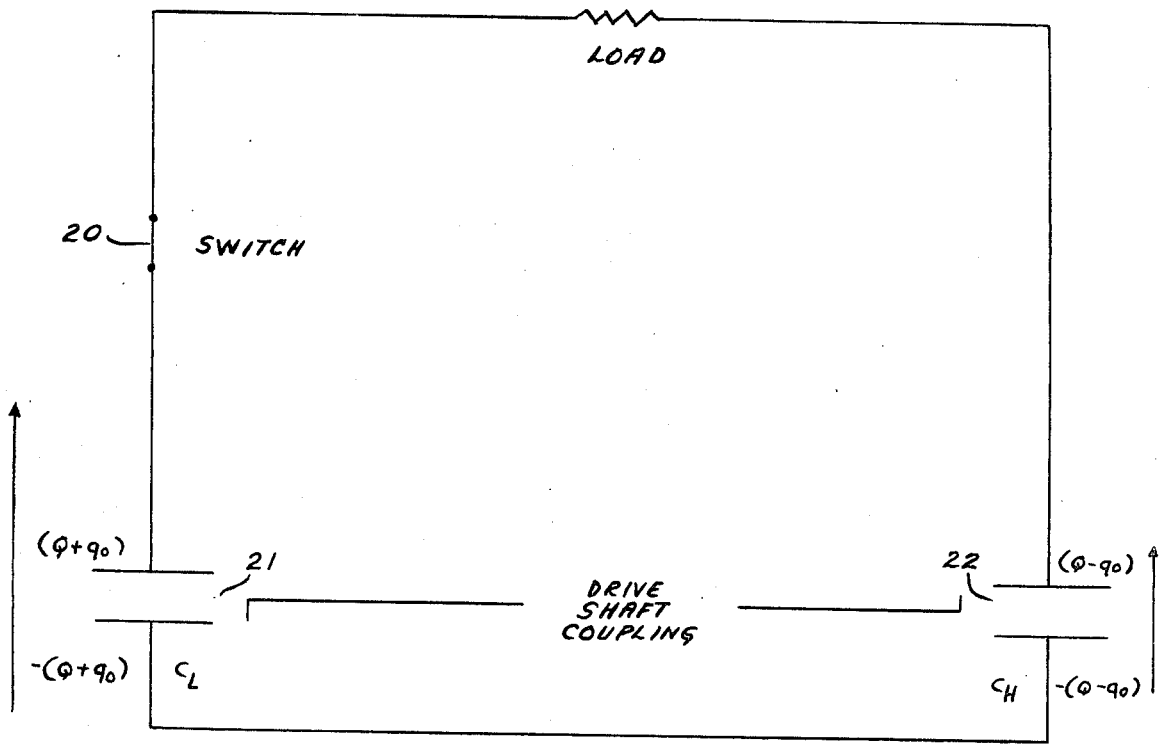
FIG. 9 is the same embodiment except in State C.

State C (FIG. 9): The switch 20 is now closed. The potential rise across capacitor 21 is now equal to the potential drop across the load and the potential drop across capacitor 22. It is assumed, for the purpose of this exposition, that the transient response time of the electric circuit is much faster than the time required for one complete cycle of the variable capacitors (that is, the time required for the variable capacitors, starting at respective initial states, to return to those respective states, as the drive shaft rotates). With $q$ now representing the charge being transferred, the equation for the electrical circuit response is given as $$(Q + q_o - q)/C_L = R(dq/dt) + (Q - q_o + q)/C_H$$

When $t = 0$, $q = 0$; when $t = \infty$, $q = 2q_o$.
The solution of the previous equation is as follows:

$$q = 2q_o[1 - \exp[-(1/R)(1/C_L + 1/C_H)t]]$$

And from the earlier equation $(Q + q_o)/C_H = (Q - q_o)/C_L$ $$q_o = \frac{(1/C_L - 1/C_H)}{(1/C_L + 1/C_H)} Q$$

Figure 10:
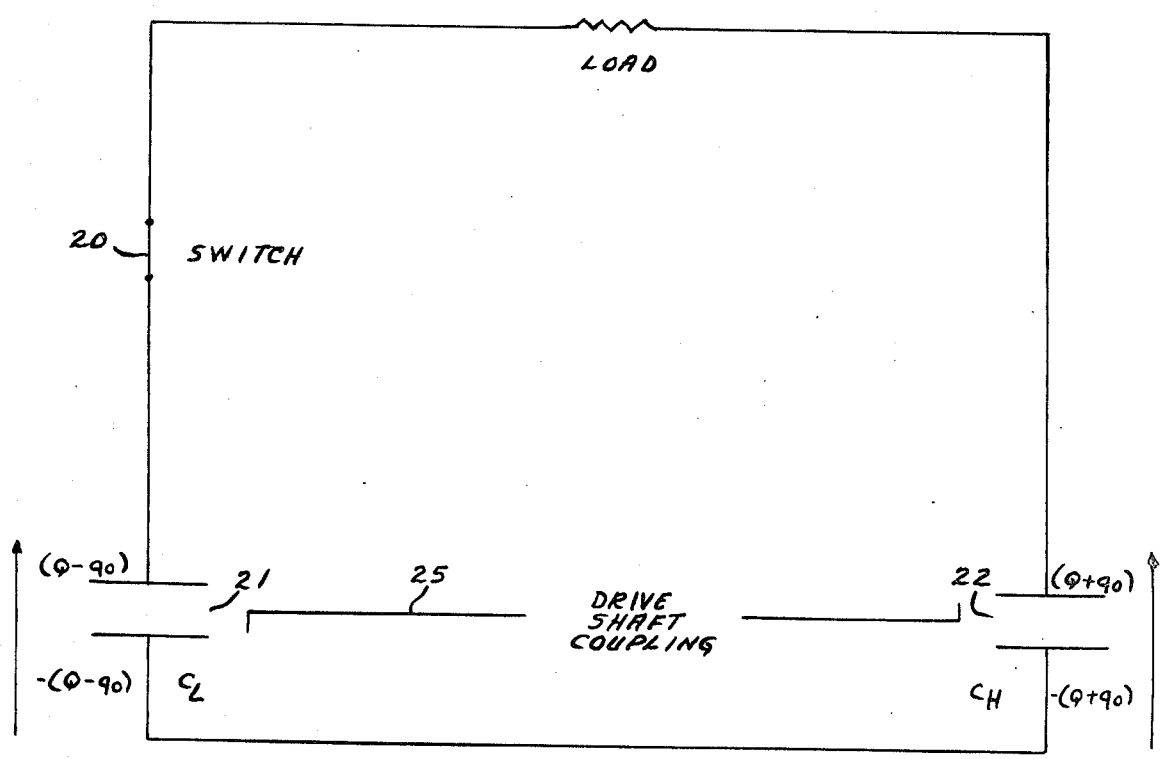
FIG. 10 is the same embodiment except in State D.

State D (FIG. 10): After charge rearrangement by a flow of current through the load, capacitor 22 is in the same state as capacitor 21 in State A; capacitor 21 is in the same state as capacitor 22 in State A; and the total electrical energy for the electrical circuit in State D, $W_D$, is given as $$W_D = \tfrac{1}{2}(Q + q_o)^2/C_H + \tfrac{1}{2}(Q - q_o)^2/C_L$$

By subtracting this equation from the one in State B, it is seen that:

$$W_B - W_D = 2q_o^2(1/C_L + 1/C_H) = 4[\tfrac{1}{2}q_o^2(1/C_L + 1/C_H)]$$

$$\int_0^\infty R(\frac{dq}{dt})^2 dt = 2q_0^2(1/C_L + 1/C_H) = W_B - W_D$$

Electrostatic energy is delivered to the load. As the drive shaft 25 rotates, capacitors 21 and 22 will again go through States B and C, with their roles interchanged, until the capacitors return to their respective states as given in State A. For this second half of the cycle, the same amount of energy is delivered to the load as was delivered in the first half of the cycle; hence, the energy delivered to the load per cycle, W, is given as follows:

$$W = 2(W_B - W_D) = 8[\tfrac{1}{2} q_0^2(1/C_L + 1/C_H)]$$

The limit on energy transfer may be determined as follows. The breakdown potential for the variable capacitors, $V_{CB}$ (volts), may be related to the charge on the variable capacitors:

$$(Q + q_0)/C_L = V_{CB}$$

By use of this equation and the one given at the end of State C, the limiting value of $q_0$ may be given as follows:

$$q_0 = (C_L/2)(1 - C_L/C_H)V_{CB}$$

By substitution of the above value of $q_0$ into the foregoing equation for $W$, the limit on $W$, $W_{CB}$, is given as $$W_{CB} = (1 + C_L/C_H)(1 - C_L/C_H)^2 C_L V_{CB}^2$$

The range of $W$ is then given as follows: $0 \leq W < W_{CB}$

For non-negligible circuit inductance, such as, for example, a series inductance L (henries), the equation for the electrical circuit response is given as $$(Q + q_0 - q)/C_L = R(dq/dt) + L(d^2q/dt^2) + (Q - q_0 + q)/C_H$$

When $t = 0$, $q = 0$; when $t = \infty$, $q = 2q_0$; the solutions are given as follows.

For over damped response, $(R/2L)^2 > (1/L)(1/C_L + 1/C_H)$, $$q = 2Q[\frac{C_H - C_L}{C_H + C_L}][1 - \exp(-\frac{Rt}{2L})[\frac{R}{2La}\sinh(at) + \cosh(at)]]$$

With $$a = \sqrt{(\frac{R}{2L})^2 - \frac{1}{L}(\frac{1}{C_L} + \frac{1}{C_H})}$$

For critically damped response, $(R/2L)^2 = (1/L)(1/C_L + 1/C_H)$, $$q = 2Q[\frac{C_H - C_L}{C_H + C_L}][1 - \exp(-\frac{Rt}{2L}) - \frac{Rt}{2L}\exp(-\frac{Rt}{2L})]$$

For under damped response, $(R/2L)^2 < (1/L)(1/C_L + 1/C_H)$, $$q = 2Q\frac{C_H - C_L}{C_H + C_L}[1 - \exp(-\frac{Rt}{2L})[\frac{R}{2Lb}\sin(bt) + \cos(bt)]]$$

With $b$ being given by $a$, as defined above, divided by the square root of minus one. The relation between Q and $q_0$ is $$q_0 = \frac{(1/C_L - 1/C_H)}{(1/C_L + 1/C_H)} Q.$$

as previously stated.

Figure 11:
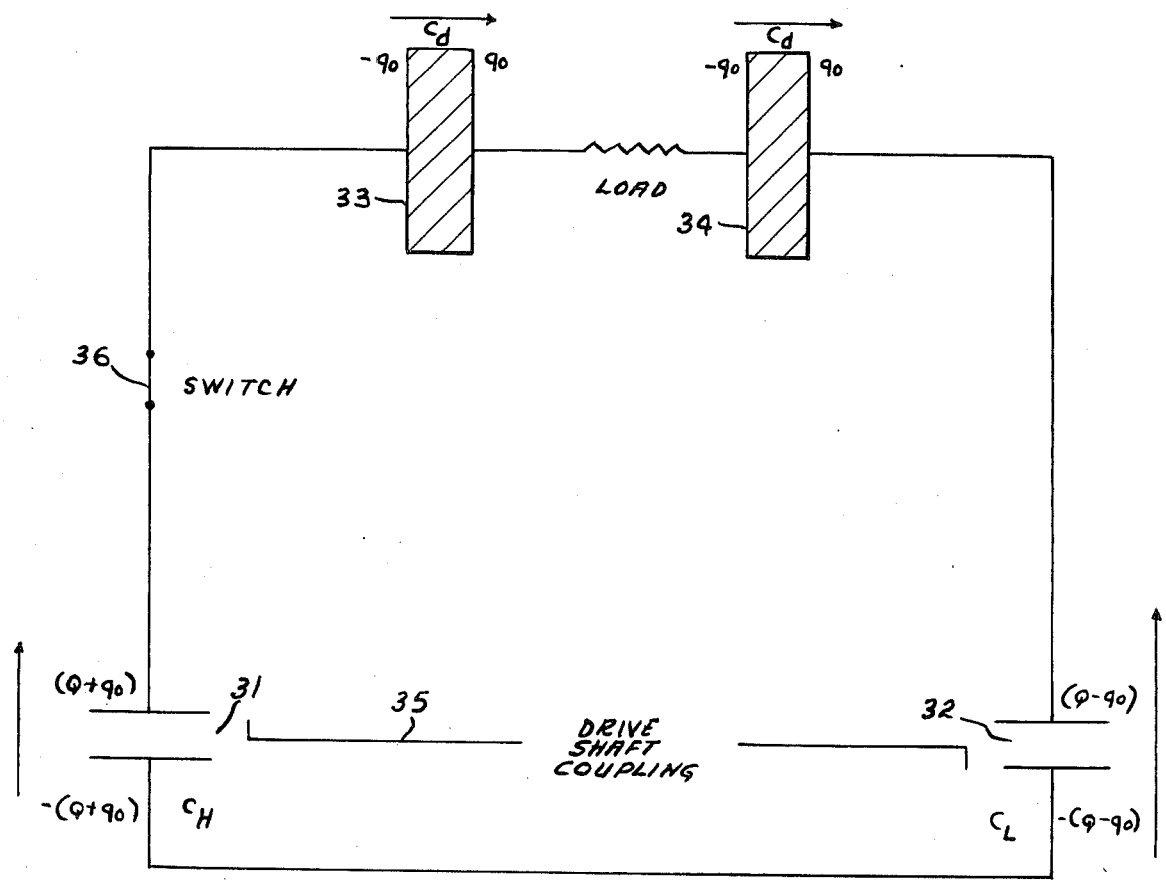
FIG. 11 is a schematic representation of an embodiment of the invention having pulsed energy input with the generators indirectly connected to the load through dielectric material, in State A.

An embodiment of the invention for operation with pulsed energy input and the electrical load connected through dielectric material, such as barium titanate, is schematically illustrated in FIG. 11. This type of system is ideally suited for the production of molecular excitation and volume ionization of high-pressure lasing media. As in the previous embodiment, four states or end positions of arcs of rotational movement will be illustrated.

State A (FIG. 11): Capacitor 31 has capacitance $C_H$ and a charge $(Q + q_0)$; capacitor 32 has capacitance $C_L$ and a charge $(Q - q_0)$. The potential rise across capacitor 32 is equal to the sum of the potential drops across each dielectric electrode (33 and 34, each of capacitance $c_d$) and capacitor 31:

$$(Q - q_0)/C_L = 2q_0/c_d + (Q + q_0)/C_H$$

The total electrical energy of the electric circuit in State A is given as follows:

$$W_A = \tfrac{1}{2}(Q + q_0)^2/C_H + q_0^2/c_d + \tfrac{1}{2}(Q - q_0)^2/C_L$$

Switch 36 is opened and, as drive shaft 35 rotates, the capacitance of capacitors 31 and 32 changes, and state B is reached.

Figure 12:
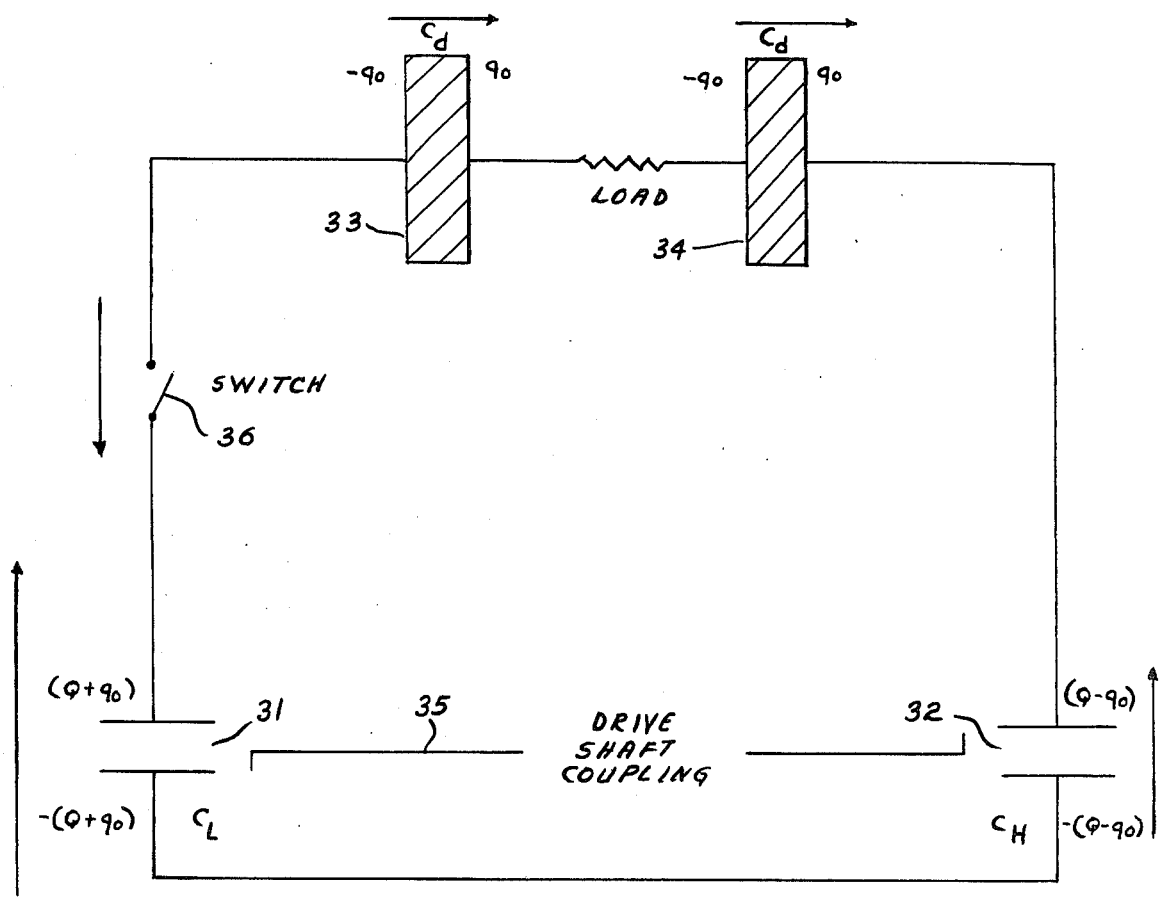
FIG. 12 is the same embodiment of FIG. 11 except in State B.

State B (FIG. 12): Capacitor 31 now has capacitance $C_L$ and capacitor 32 has capacitance $C_H$. The total electrical energy for the electric circuit in State B is given as follows:

$$W_B = \tfrac{1}{2}(Q + q_0)^2/C_L + q_0^2/c_d + \tfrac{1}{2}(Q - q_0)^2/C_H$$

The potential rise across capacitor 31 and the two capacitances $c_d$ equals the potential drop across the switch and capacitor 32.

Figure 13:
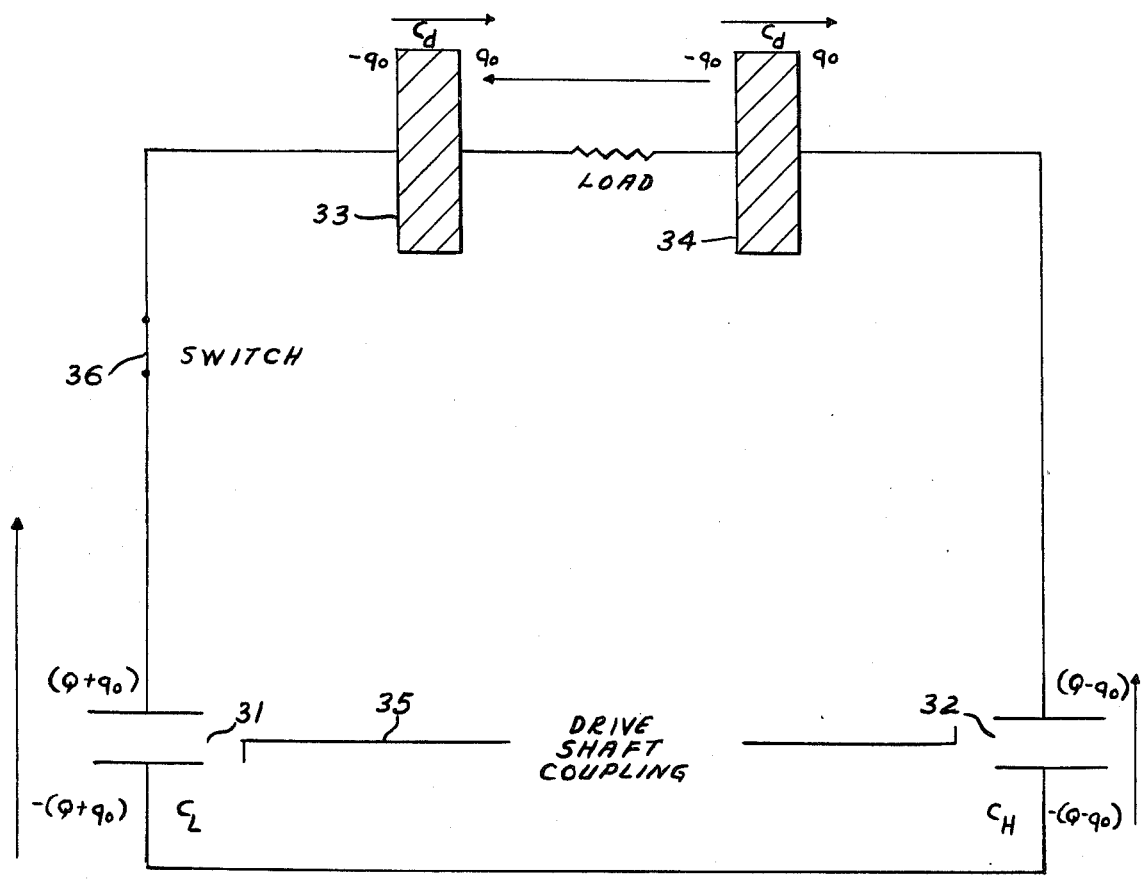
FIG. 13 is the same embodiment of FIG. 11 except in State C.

State C (FIG. 13): Switch 36 is now closed. The potential rise across capacitor 31 and the two capacitances $c_d$ equals the potential drop across the load and capacitor 32. The equation for the electrical circuit response is given as follows:

$$(Q + q_0 - q)/C_L + 2(q_0 - q)/c_d = R(dq/dt) + (Q - q_0 + q)/C_H$$

When $t = 0$, $q = 0$; when $t = \infty$, $q = 2q_0$. Solution of the equation is as follows:

$$q = 2q_0[1 - \exp[-(1/R)(1/C_L + 2/c_d + 1/C_H)t]]$$

With, as given previously, $$q_0 = \frac{(1/C_L - 1/C_H)Q}{(1/C_L + 2/c_d + 1/C_H)}$$

Figure 14:
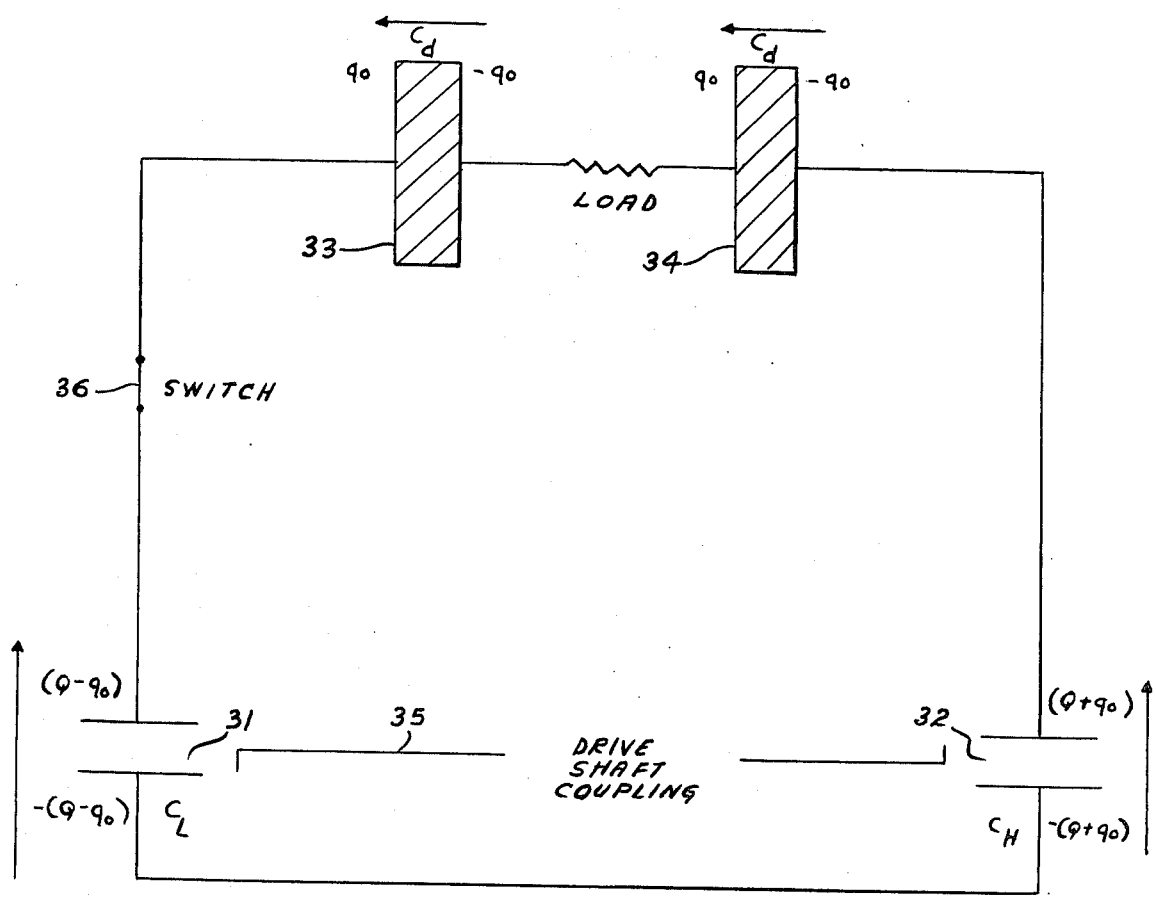
FIG. 14 is the same embodiment of FIG. 11 except in State D.

State D (FIG. 14): After charge rearrangement, capacitor 32 is in the same state as capacitor 31 in State A; capacitor 31 is in the same state as capacitor 32 in State A; and the polarity of the charge on the dielectric capacitances has been reversed. The total electrical energy for the electric circuit in State D is given as follows:

$$W_D = \tfrac{1}{4}(Q + q_o)^2/C_H + q_o^2/c_d + \tfrac{1}{4}(Q - q_o)^2/C_L$$

By combining equations, it is seen that:

$$W_B - W_D = 2q_o^2(1/C_L + 2/c_d + 1/C_H) = 4[\tfrac{1}{2}q_o^2(1/C_L + 2/c_d + 1/C_H)]$$

And that:

$$\int_0^\infty R\left(\frac{dq}{dt}\right)^2 dt = 2q_o^2(1/C_L + 2/c_d + 1/C_H) = W_B - W_D$$

Electrostatic energy is delivered to the load. As drive shaft 35 rotates, capacitors 31 and 32 will again go through States B and C, with their roles interchanged, until the capacitors return to their respective states as given in State A. For this second half of the cycle, the same amount of energy is delivered to the load as was delivered in the first half of the cycle; hence, the energy delivered to the load per cycle, W, is given as follows:

$$W = 2(W_B - W_D) = 8[\tfrac{1}{2}q_o^2](1/C_L + 2/c_d + 1/C_H)$$

Assuming $q_o$ limited by the breakdown potential of the dielectric material, $V_{dB}$, $q_o = c_d V_{dB}$. Then, the limit on $W$, $W_{dB}$, is as follows:

$$W_{dB} = 4(c_d/C_L + 2 + c_d/C_H)c_d V_{dB}^2$$

The range of W is then given as follows: $0 \leq W < W_{dB}$

FIG. 15 schematically illustrates an embodiment of the invention having continuous mechanical energy input and providing a continuous wave output to the loads. It is similar to previous FIG. 4 except for designations of charge and capacitance.

Consider the system schematic as shown in FIG. 15; and, at time $t = 0$, the variable capacitors 41 and 42 have the same capacitance, the same charge Q, and hence are at the same potential. Capacitor 42 is out of phase with capacitor 41 by half a period; the capacitors vary periodically with period T (seconds).

The circuit equation for the transported charge $q$ is as follows: assuming negligible circuit inductance:

$$(Q - q)/C_1 = R(dq/dt) + (Q + q)/C_2$$

with $q = 0$, for $t = 0$.

With sinusoidal input to the load, for the following assumed capacitance:

$$C_1 = \frac{1}{\frac{1}{C_H} + \left(\frac{1}{C_L} - \frac{1}{C_H}\right)\left[\frac{1 - \cos\frac{2\pi}{T}(t + \frac{T}{4})}{2}\right]}$$

$$C_2 = \frac{1}{\frac{1}{C_H} + \left(\frac{1}{C_L} - \frac{1}{C_H}\right)\left[\frac{1 + \cos\frac{2\pi}{T}(t + \frac{T}{4})}{2}\right]}$$

$$q = \frac{\frac{Q}{R}\left[\frac{1}{C_L} - \frac{1}{C_H}\right]}{\sqrt{\left(\frac{2\pi}{T}\right)^2 + \left[\frac{1}{R}\left(\frac{1}{C_L} + \frac{1}{C_H}\right)\right]^2}} \times$$

$$\left[\begin{array}{l}\cos\left[\frac{\pi}{2} - \arctan\left(\left[\frac{2\pi}{T}\right]/\left[\frac{1}{R}\left(\frac{1}{C_L} + \frac{1}{C_H}\right)\right]\right)\right]\exp\left[-\frac{1}{R}\left(\frac{1}{C_L} + \frac{1}{C_H}\right)t\right] \\ -\cos\left[\frac{2\pi}{T}(t + \frac{T}{4}) - \arctan\left(\left[\frac{2\pi}{T}\right]/\left[\frac{1}{R}\left(\frac{1}{C_L} + \frac{1}{C_H}\right)\right]\right)\right]\end{array}\right]$$

with average power, P (watts), given, for the electrical circuit time constant, $$1/\left[\frac{1}{R}\left(\frac{1}{C_L} + \frac{1}{C_H}\right)\right],$$

much less than $T$, and after transient decay, as follows:

$$P = \frac{1}{T}\int_t^{t+T} R\left(\frac{dq}{dt}\right)^2 dt = \frac{2\pi^2 R Q^2 (C_H - C_L)^2}{T^2(C_H + C_L)^2}$$

and with Q limited by the breakdown potential $V_{CB}$ of the capacitors as follows:

$$\left[\frac{(Q - q)}{C_1}\right]_{maximum} = \frac{Q(C_H + C_L)}{2C_H C_L} = V_{CB}$$

By use of these last two equations, the limit on P, $P_{CB}$, is:

$$P_{CB} = \frac{8\pi^2 C_H C_L (C_H - C_L)^2 V_{CB}^2}{T^2(C_H + C_L)^3 \left(\frac{1}{R}\right)\left(\frac{1}{C_L} + \frac{1}{C_H}\right)}$$

The range of $P$ is then given as follows: $0 \leq P < P_{CB}$

As with the pulsed embodiments the load on the cw embodiments may be an electrostatic field between dielectric electrodes. It is also to be understood that the electrical outputs of generating embodiments of the invention, while generally of quite high electrical potential, may be rectified (and filtered), or run through a transformer effecting an impedance change, or any of the other conventional electrical changes and usages that are common practice with continuous wave or pulsed alternating current voltages.

It is also to be understood that for simplicity, only one movable and one fixed plate has been shown for a variable capacitor, and that embodiments may be constructed that have capacitors with many fixed and movable plates. A plurality of embodiments may be connected in series for providing higher output voltages and better voltage breakdown characteristics. The polarity of the charge placed on the capacitors, i.e., the common polarity of all the fixed plates of an embodiment with respect to the movable plates is immaterial.

The electrostatic energy conversion system of the invention may also be operated as a motor. FIG. 16 is a simplified schematic representation of an embodiment of the invention for receiving electrical energy from a power source 45 and providing torque to rotate shaft 48. Variable capacitors 46 and 47 are similar to those in the generating device, with the capacitance of capacitor 46 being a maximum when the capacitance of capacitor 47 is a minimum. Shaft 48 is driven by the forces of the capacitor plates to rotate in synchronism with the frequency of source 45. Thus, unless the frequency of source 45 is relatively slowly increased from dc to the desired operating frequency, other conventional means such as are normally used to get synchronous motors up to synchronous speed may be used to bring shaft 48 up to substantially synchronous speed with the line frequency of the source of electrical power before connection is made.

It is to be understood that the devices of the invention, generally like other electrostatic devices from a practical consideration, generally function with relatively high voltages compared to conventional electromagnetic equipment. As pointed out by Trump in the previously referenced AIEE (now IEEE) paper, two metallic plates of 100 square inches area which are parallel and insulated from each other, with an electric field of 300 volts per centimeter between them have an electrostatic force of attraction of about 0.0005 pound. If the active gradient is increased to 30,000 volts per centimeter, which is the highest voltage that can be insulated in atmospheric air, the electrostatic force between the plates is increased to little more than 0.5 pound. When the plates are immersed in a high vacuum and the gradient increased to 3 million volts per centimeter, the electrostatic force then becomes approximately 5,700 pounds.

From the foregoing, it is readily apparent that for embodiments of the invention to be practical, the variable capacitors should be operated in a high vacuum. For embodiments used in outer space, this is generally not a problem, but for terrestial embodiments, it is generally preferred that a sealed chamber having a high vacuum be used. Insulative gases such as sulphur hexafluoride or air at high pressures may be used instead of the high vacuum to provide the necessary insulation at the high voltages required for practical operation. Another reason for generally preferring the high vacuum environment for embodiments of the invention is the elimination of drag on the moving members. A complete system for the cw generation of electrical power under normal terrestial conditions is shown schematically in FIG. 17. Variable capacitors 50 and 51, with rotation, pass a contained charge back and forth between them causing a current to flow through load 52 delivering power to it. Driver 53 may be any suitable device that can supply the torque necessary to rotate the movable plates of the capacitors such as an electric motor, a turbine, or even a hand crank. Generally, it is desirable to provide conventional speed sensor 54 with conventional feedback control 55, actuating energy input controller 56, so that the frequency of the generated electrical energy supplied to load 52 is relatively constant. An initial charge is placed on variable capacitors 50 and 51 by momentarily closing switch 57 causing conventional high potential source 58 to place an equal potential charge of the same polarity on each capacitor. It is generally desirable to position the movable plates of the capacitors such that they have equal capacity when initially charged so that the initial charge magnitudes will also be equal. The capacitors are operated in a high vacuum in conventional sealed chamber 59. Conventional vacuum pump 60 provides the high vacuum in the chamber (approximately $10^{-8}$ Torr). Mechanical drive shaft 61 extends through the chamber walls in magnetically sealed rotary motion feedthroughs 62 and 63. These conventional, commercially available, sealed bearings having ferrofluid seals provide substantially zero leakage (at speeds up to 10,000 rpm) to a high vacuum on one side of the bearing seal and atmospheric pressure on the other side of the bearing. Conventional capacitor plate material such as stainless steel is suitable and generally preferable. Conventional high voltage feedthroughs 64 and 65 provide for transfer of charge from the stator capacitor plates to the load.

As previously stated, once the charge is placed on the capacitors it is not diminished or dissipated in supplying power to the load. It is a contained or trapped charge, and is not run down by the load. If the insulation within the chamber were perfect, the charge would never have to be replenished. Since nothing is perfect the charge will, over a long period of time, decrease. It may be replenished by momentarily actuating switch 57 as in the initial charging of the capacitors or the charge may be automatically held within predetermined maximum and minimum values on the capacitor plates by an electrical circuit as shown schematically in FIG. 18. For simplicity of explanation, maximum voltage monitoring is shown on one side of the capacitor pair and minimum voltage monitoring on the other. It is to be understood that both a maximum and a minimum monitoring may be on the same side, or simultaneously on both sides, if desired. Potential source 70 and diode 71 add charge when the voltage potential of capacitor 72 is below that of source 70 when capacitor 72 is at maximum capacitance. Potential source 73 in cooperation with diode 74 removes charge when the voltage of capacitor 75 (when going through its minimum capacitance) is greater than the potential of 73. By having potential sources 70 and 73 adjustable and controllable by conventional voltage monitor 76, the correct value of trapped charge for the system is maintained for desired voltage (or power) for load 77. The regulating system shown in FIG. 18 may also be used to compensate for leakage losses.

FIG. 19 illustrates in block schematic form the advantages of the disclosed invention in supplying a high potential to a load such as a laser. In the conventional prior art systems, shaft power 90 turns conventional electrical generator 91 generating relatively low voltage, high current energy, to operate conventional high voltage power supply 92 which changes capacitor 93 through resistor 94. Capacitor 93 discharges when switch 95 is closed to supply the load 96 with energy. In the present invention, shaft power 90a directly actuates inversely ganged capacitors 93a and 93b providing an electrostatic energy charge equivalent to that placed on capacitor 93 by power supply 92. Thus, the closing of switch 95a provides the same energy to the identical load 96a as in the prior art system. In the illustration bipolar pulses flow to load 96a. If unipolar pulses are desired for the load 96a as for load 96 in the prior art circuit, conventional rectification of the bipolar pulse may be used.

I claim:

1. An alternating current electrostatic energy converter comprising:
   a. a first and a second variable capacitor, each having a maximum and a minimum capacitance, connected in paired opposition and inversely ganged such that one capacitor passes through a maximum capacitance as the other capacitor is going through a minimum capacitance;
   b. means for placing an initial and contained electrical charge on the said first and second capacitors;
   c. means for actuating the said capacitors through their maximum and minimum capacitance passing contained charge between them; and
   d. means for extracting power from the said capacitors.

2. An electrostatic alternating current generating system comprising:
   a. a first and a second variable capacitor, each having a maximum and a minimum capacitance, inversely ganged on a common shaft such that one capacitor passes through a maximum capacitance as the other capacitor is going through a minimum capacitance;
   b. means for placing an initial and contained electrical charge on the said first and second capacitors;
   c. means for actuating the said shaft moving capacitors through their maximum and minimum capacitance;
   d. an electrical load; and
   e. means for connecting the said first and second variable capacitors in paired opposition to one another across the said load whereby contained charge is passed back and forth between the said capacitors through the said load.

3. An electrostatic alternating current generator comprising:
   a. a first variable capacitor having a fixed plate and a movable plate providing a maximum and a minimum capacitance between the said fixed plate and the said movable plate;
   b. a second variable capacitor having a fixed plate and a movable plate providing a maximum and a minimum capacitance between the said fixed plate and the said movable plate;
   c. means for mechanically coupling the said movable plate of the said first capacitor to the movable plate of the said second capacitor such that the capacity of one variable capacitor is at a maximum capacitance when the other variable capacitor is at a minimum;
   d. means for electrically connecting the said movable plates;
   e. means for placing a contained electrical charge on the said variable capacitors such that the said fixed plates have like polarity charge;
   f. means for actuating the said variable capacitors through a change of capacitance; and
   g. means for connecting an electrical load between the said fixed plates of the variable capacitors, whereby with change of capacitance of the said capacitors, contained charge is passed between the said capacitors through the said load.

4. The apparatus as claimed in claim 3 wherein the said means for placing a charge on the said variable capacitors includes means for placing equal initial charges on the said variable capacitors.

5. The apparatus as claimed in claim 4 wherein a means for providing an evacuated enclosure and a means for positioning the said first and second variable capacitors within the said evacuated enclosure are provided.

6. The apparatus as claimed in claim 5 wherein the said means for actuating the said variable capacitors is rotational.

7. The apparatus as claimed in claim 5 wherein the said means for actuating the said variable capacitors is reciprocating.

8. A synchronous alternating current electrostatic motor comprising:
   a. a first and a second variable capacitor each having a maximum and a minimum capacitance, connected in paired opposition inversely ganged on a common shaft such that one capacitor passes through a maximum capacitance as the other capacitor is going through a minimum capacitance;
   b. means for placing an initial, contained, electrical charge on the said first and second capacitors;
   c. means for placing an alternating potential voltage on the said first and second capacitors; and
   d. means for connecting a mechanical load to the said shaft.

* * * * *

UNITED STATES PATENT AND TRADEMARK OFFICE
CERTIFICATE OF CORRECTION

PATENT NO. : 4,127,804
DATED : Nov. 28, 1973
INVENTOR(S) : Onezime P. Breaux

It is certified that error appears in the above-identified patent and that said Letters Patent are hereby corrected as shown below:

On the front page delete:

--/73/ Assignee: The United States of America as represented by the Secretary of the Air Force, Washington, D.C.

Signed and Sealed this

Twenty-fourth Day of April 1979

[SEAL]

Attest:

RUTH C. MASON
Attesting Officer

DONALD W. BANNER
Commissioner of Patents and Trademarks